Figure 1:
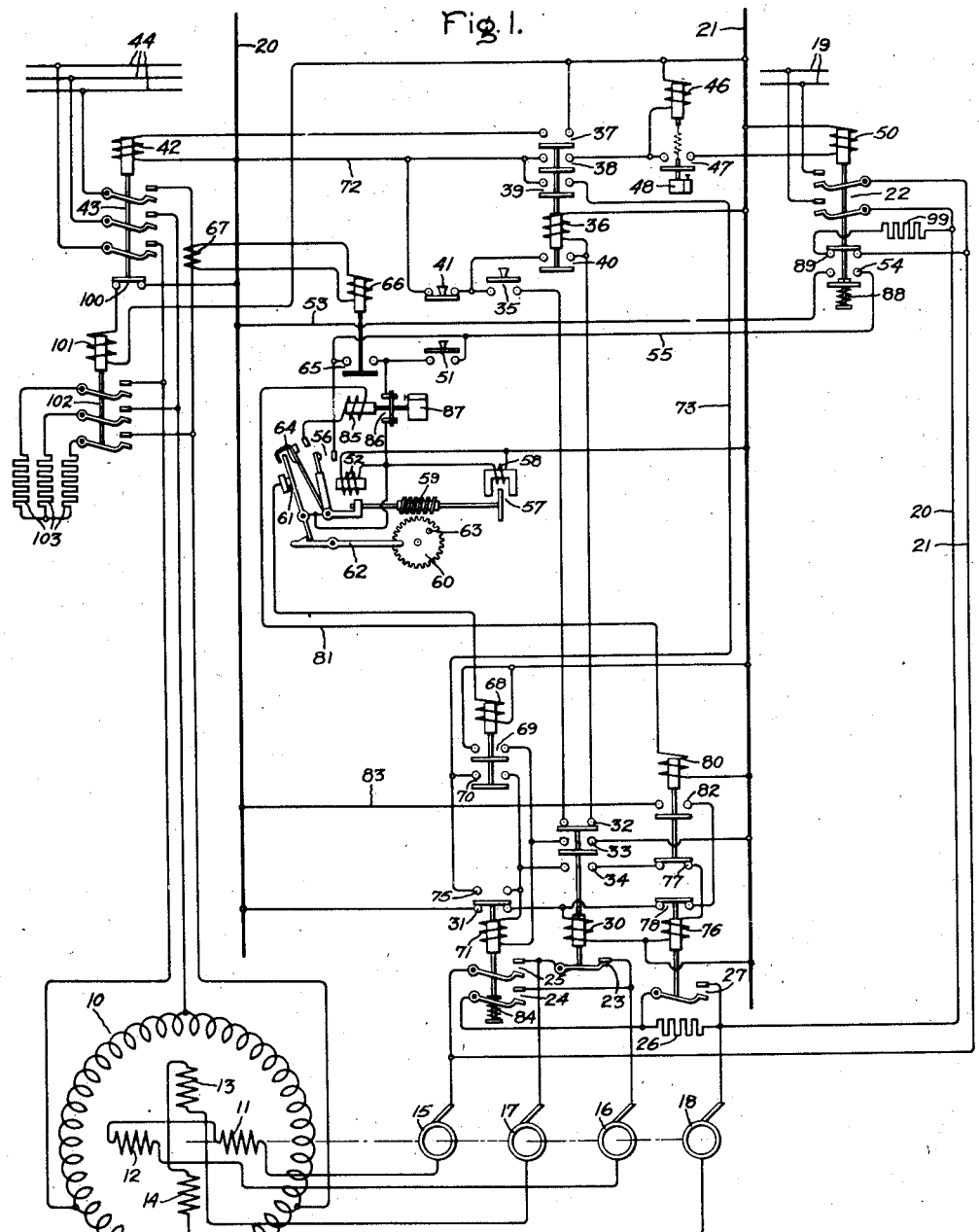

Feb. 13, 1934.　　　C. E. KILBOURNE　　　1,947,266

SYSTEM OF MOTOR CONTROL

Filed Aug. 6, 1932

Inventor:
Charles E. Kilbourne,
by Charles E. Killar
His Attorney.

Patented Feb. 13, 1934

1,947,266

UNITED STATES PATENT OFFICE 1,947,266

SYSTEM OF MOTOR CONTROL

Charles E. Kilbourne, Schenectady, N. Y., assignor to General Electric Company, a corporation of New York Application August 6, 1932. Serial No. 627,781

9 Claims. (Cl. 172—274)

My invention relates to systems of motor control, more particularly to control systems for synchronous motors, and has for its object a simple and reliable means for temporarily changing the connections of the field windings of the motor so as to provide for increased field excitation to take care of transient conditions.

In a copending application of Theodore Dreier and Charles E. Kilbourne, Serial No. 627,780, filed August 6, 1932, assigned to the same assignee as this invention, there is described and claimed broadly a system for changing the field connections of a motor without loss of excitation wherein the field windings are switched from series to parallel in groups of north and south pole field windings, this change being made to give increased dynamic braking during stopping of the motor whereby the motor is brought quickly to rest. My present invention is an improvement over the invention of the said Dreier and Kilbourne application, which invention was made prior to my present invention, and I therefore do not claim herein anything shown or described in said Dreier and Kilbourne application.

My present invention relates especially to means for changing the field connections to give increased field excitation temporarily for short periods during operation of the motor to provide for stability of operation of the motor during transient conditions, such as sudden overloads or surges, after which the fields are reconnected as before without interrupting the operation of the motor for the continuance of normal operation. It is a further object of my invention to provide means for changing the field connections without greatly lowering the normal pull out torque of the motor at any instant.

In carrying out my invention I provide switches and connections for changing the connections of the field windings from series to parallel for increased excitation including a resistance, and a series switch between the field windings whereby the field windings are normally connected in series, together with switches for establishing parallel circuits around the field windings and the series switch, one of said circuits including the resistance, after which the series switch may be opened and the resistance short circuited to provide parallel connections for the field windings for increased excitation.

The transfer of connections is thus made without decrease in field excitation at any instant such as would occur if the field circuit was opened in making the change. This system also provides for the change in the connections back to series without interrupting the operation of the motor. My invention also comprehends a timing device for automatically changing the connections back to series after a predetermined time interval, together with load responsive means for initially changing the connections from series to parallel and for initiating operation of the timing device.

Figure 2:
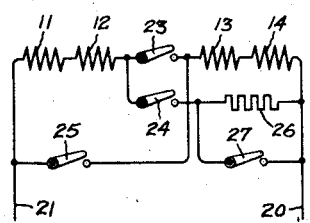

For a more complete understanding of my invention reference should be had to the accompanying drawing, Fig. 1 of which is a diagrammatic representation of a system of motor control embodying my invention, while Fig. 2 is a simplified diagrammatic representation of the switching means for the field windings.

Referring to the drawing, I have shown my invention in one form as applied to the control of an alternating current synchronous motor comprising a three-phase armature winding 10 mounted on a stator member and field windings 11, 12, 13 and 14 mounted on a rotor member. While only four field windings constituting the same number of poles are shown for purposes of illustration and while the windings are shown divided into only two parts or sets for switching purposes, it will be understood that my invention is not limited to this number of field windings or division of field windings. The field windings 11 and 12, constituting one part or set, excite poles of like polarity such as north. These windings are connected in series with each other and they are also connected to the slip rings 15 and 16 which are mounted on the rotor or shaft of the motor in insulated relation therewith. In like manner the south pole windings 13 and 14 constituting the other part or set are connected in series and to the slip rings 17 and 18 also mounted on the rotary shaft.

The field windings may be energized from a suitable direct current source of supply 19 through conductors 20 and 21 and suitable switching mechanism including a switch 22 for connecting the supply source to the conductors 20 and 21, a series switch 23 for connecting the two sets of windings in series with each other and upon occasion through two paralleling switches 24 and 25.

A clear understanding of the fundamentals of my invention may now perhaps best be had by reference to Fig. 2 showing it in its fundamental aspects. During normal operation the field windings are connected in series relation with each other to the field supply source, the switch 23 being closed and the switches 24, 25 and 27 being open. In the event now that it is desired to change the connections of the two sets of field windings from series to parallel for increased excitation to take care, for example, of a transient condition, the switches 24 and 25 are first closed whereby parallel circuits are closed around the series switch in each set of field windings, the switch 24 establishing a parallel circuit around the switch 23 and the field windings 13 and 14, a resistance 26 being included in this parallel circuit, while the switch 25 establishes a parallel circuit around the series switch 23 and the field windings 11 and 12. It will be observed that the resistance 26 prevents a short circuit across the field supply source.

It will be observed that the establishment of these connections doubles the excitation voltage applied to the field windings 13 and 14 since they are connected directly to the supply source, and also provides a closed discharge circuit for these windings through the supply source so that the switch 23 may be opened without damaging arcing. The excitation voltage of field windings 11 and 12, since they are short circuited, is zero, but because of the tendency of the machine circuits to hold constant flux linkages by virtue of the magnetic energy stored in the machine, the total excitation of the whole field winding is not substantially decreased from the normal condition during the very short time of the switching operation. The switch 23 is next opened, after which the switch 27 is closed to short circuit the resistance 26. This completes the connection of the field windings in parallel for double excitation and applies double voltage to the entire winding.

In order to change the connections back to series the switches are operated in the reverse order, i. e., first the switch 27 is opened, then the switch 23 is closed and finally the switches 24 and 25 are opened. In this manner the field connections can be changed as desired from series to parallel or vice versa without interrupting the operation of the motor or without substantial decrease in the torque of the motor at any instant.

As shown, the various switches 23, 24, 25 and 27 are electromagnetically operated and my invention also comprehends a system of control for these switches as shown in Fig. 1.

In starting the motor, the supply conductors 20 and 21 are first connected to a suitable electrical supply source by a switch (not shown). A circuit is immediately established for the operating coil 30 of the switch 23 whereby this switch is closed as shown in the drawing to connect the field windings in series with each other. This circuit for the coil 30 leads from the supply conductor 20 through an interlock switch 31 which is closed and the coil 30 to the supply conductors 21. The closing of the switch 23 at the same time closes its interlock switch 32 and opens its interlock switches 33 and 34.

The circuits are now ready for the starting of the motor which is effected by means of a push button switch 35. This switch closes the circuit for the operating coil 36 which closes four relay switches 37, 38, 39 and 40, the circuit for the coil 36 leading from the supply conductor 20, through the normally closed stop push button 41, the button 35, the interlock switch 32 which is now closed, and the coil 36 to the supply conductor 21. The relay switch 37 closed by the coil 36 establishes a circuit for the operating coil 42 which closes the triple pole switch 43, thereby connecting the motor armature to a suitable three-phase supply source 44. The motor thereupon starts and accelerates to approximately synchronous speed. It will be understood that the motor is provided with suitable starting means, such as a squirrel cage winding (not shown) on its field member.

Upon its closing, the relay switch 38 closes a circuit for the operating coil 46 connected to operate a time relay switch 47. This time switch may be of any suitable construction and is shown as connected to a dashpot 48 whereby its closing movement is delayed, and to the armature of the coil 46 by means of a spring. After a predetermined interval determined by the dashpot during which the motor accelerates to substantially its synchronous speed, the switch 47 closes a circuit through the relay switch 38 for the operating coil 50. This coil closes the switch 22 whereby the motor field windings are connected to the direct current supply source 19 in series relation with each other by reason of the fact that the switch 23 is closed. The motor is now operating as a synchronous motor. The closing of the relay switch 39 has no immediate effect on the motor. The relay switch 40, however, closes a holding circuit for the coil 36, this holding circuit being across the switch 32, and also across the push button 35 so that the push button can be released immediately after the coil 36 is energized.

When it is desired to connect the field windings of the motor in parallel for increased excitation, the push button 51 is pressed whereby a circuit is closed for the operating coil 52, this circuit leading from the supply conductor 20 through the conductor 53, the relay switch 54 which is closed concurrently with the closing of the switch 22, conductor 55, push button 51, coil 52 and thence to the supply conductor 21. The coil 52 immediately closes a switch 56 in parallel with the push button 51 which can be released.

The coil 52 also initiates the operation of a suitable timing device, such as described and claimed in the Stephenson Patent 1,699,125. This timing device is driven by a small electrical motor 57 or other suitable device, the energizing coil 58 of which is connected in parallel with the coil 52. Concurrently with the closing of the switch 56, the coil 52 moves a worm 59 driven by the motor into engagement with a worm wheel 60. As shown a switch 61 is held in its closed position by a pivoted latch 62. After a predetermined time interval, the timing motor 57 drives the worm wheel 60 around until a release pin 63 thereupon engages the latch and trips it to release the switch 61 which is biased to its open position by the coil 52. The coil 52 also biases a switch arm 64 to the closed position. As shown the switch arm 64 has its upper end provided with a hook engaging the upper end of the pivoted contact arm of the switch 61 so that the switch arm 64 is held in the open position by the latch 62.

In order to provide for automatically energizing the coil 52 to connect the field windings in parallel, the circuit for the coil 52 may be closed in response to the load on the motor. To this end a relay switch 65 is provided in parellel with the push button 51. This switch is provided with an operating coil 66 which is connected to a current coil 67 in the armature circuit of the motor. Thus the coil 66 will be adjusted to close the switch 65 upon the occurrence of a predetermined overload. It will be understood, however, that if desired the switch 65 may be disconnected and the push button 51 used. Ordinarily the push button will be used for stopping only, when the load responsive switch 65 is provided.

The closing of the push button 51 or the switch 65 also establishes a circuit for the operating coil 68 which coil closes the two relay switches 69 and 70. The circuit for the coil 68 leads from the switch 51 or 65 through the switch 61 and the coil 68 to the supply conductor 21. The switches 69 and 70 close a circuit for the operating coil 71, this circuit leading from the supply conductor 20 through the conductor 72, the relay switch 39 which is held closed by coil 36, conductor 73, switch 70, the coil 71, switch 69 to the supply conductor 21. The coil 71 closes the two switches 24 and 25, the switch 24 connecting a resistance 26 in parallel with the circuit containing the switch 23 and the field windings 13 and 14, while the switch 25 closes a circuit in parallel with the switch 23 and the field windings 11 and 12.

Another step carried out by the energization of the coil 71 is the opening of its interlock switch 31 which deenergizes the coil 30 at the instant switches 24 and 25 close whereby the switch 23 immediately opens to open the series connection between the two sets of field windings. The coil 71 also closes an interlock switch 75 and thereby establishes a circuit for the operating coil 76 which coil closes the switch 27 and thereby short circuits the resistance 26. This circuit for the coil 76 may be traced from the supply conductor 20, switch 39, conductor 73, switch 75, switch 34 which is now closed, a relay switch 77 and coil 76 to the supply conductor 21. The interlock switch 75 also closes a holding circuit for the coil 71 leading from the conductor 73 through switch 75, coil 71 and switch 33 which is now closed to the supply conductor 21. The two sets of motor fields are now connected in parallel for double excitation and will remain so connected until the timing motor 57 operates to open switch 61 and close the switch 64.

After a predetermined time for which the timing device is set, the latch 62 is released whereby the switch 61 is opened to deenergize the coil 68, and the switch arm 64 is moved to the closed circuit position to energize the coil 80 through the conductor 81. The switches 69 and 70 immediately drop open thus turning the control of coil 71 over to the interlock switch 33. The opening of the relay switch 77 by the coil 80 deenergizes the coil 76 whereby the switch 27 opens thereby opening the shunt circuit around the resistance 26. When the switch 27 opens, the relay switch 78 mechanically connected thereto is closed and a circuit thereby closed for the coil 30. The coil 30 thereupon closes the switch 23 to establish the series connection for the field windings and also closes the relay switch 32 and opens the relay switches 33 and 34. This circuit for the coil 30 leads from the supply conductor 20 through the conductor 83, the switch 82, switch 78 and coil 30 to the supply conductor 21.

In the next step the switches 24 and 25 open, the operating coil 71 therefor having been deenergized by the opening of the interlock switch 33. Preferably the switch 25 is arranged to drop open slightly before the switch 24 so that the resistance 26 is momentarily connected in the circuit of the field coils to limit any inductive current due to sudden change in current through the field windings. For example the switch 24 may be connected to its operating rod through a spring 84 as shown so as to be held closed until after the switch 25 has opened.

The closing of the switch 64 also energizes a relay coil 85 in the conductor 81 which coil opens a switch 86 in the holding circuit for the coil 52. The switch 86 is preferably provided with a suitable timing device such as a dashpot 87 so that it is not opened until after the series connections for the field winding have been established. The deenergization of the coil 52 allows the switches 56 and 64 to open and the switch 61 to close while the worm 59 is removed from engagement with the wormwheel and the motor 57 is deenergized. The wormwheel is preferably reset with the pin 63 in a predetermined angular position as shown in the drawing as by a spring (not shown). The timing mechanism is now reset ready for the next operation.

In the event that the time interval of the timing device is not long enough to take care of the overload, it will be observed that continuation of the overload condition when the load responsive control is used will maintain the switch 65 closed and consequently the coil 52 is immediately energized again for a repetition of the cycle. It should also be understood that if desired the automatic time removal can be eliminated when the load responsive device is used, the field connections then being changed in response to the load.

The interlock switch 54 operated mechanically by the switch 22 is provided with a spring connection 88 with its operating rod so that this switch when once closed is held closed by the spring until slightly after the field switch 22 has opened. This assures that the field circuit is opened through the contactor switch 22 in the event that the motor is shut down, as by the pushing of the stop button 41, when the field windings are connected in parallel with each other for increased excitation. When the switch 22 opens, a switch 89 is closed to connect a discharge resistance 99 across the field windings. The subsequent opening of the relay switch 54 opens the circuit for the operating coil 52 and the timing motor 57.

When the switch 43 is opened by the push button 41 to stop the motor a relay switch 100 is closed, which switch closes the circuit for the operating coil 101 of a switch 102. The switch 102 is thus closed to connect the resistors 103 across the armature circuit of the motor for dynamic braking. To effect quick stopping with increased field excitation the push button 41 is pressed along with the push button 51.

While I have shown a particular embodiment of my invention, it will be understood of course that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. The combination with a motor provided with at least two field windings, a normally closed series switch between said field windings, parallel switches for establishing parallel circuits around said series switch and the respective field windings, a current limiting device in one of said parallel circuits, and means responsive to the load on the motor for effecting the operation of said switches in a predetermined sequence.

2. The combination with a motor provided with at least two field windings, a normally closed series switch between said field windings, parallel switches for establishing parallel circuits around said series switch and the respective field windings, a resistance in one of said parallel circuits, a switch for short circuiting said resistance, means responsive to the load on the motor for effecting the operation of said switches in a predetermined sequence, and timing means for controlling the operation of said switches in the reverse order after a predetermined time interval.

3. The combination with a synchronous motor provided with at least two field windings, a normally closed series switch between said field windings, parallel switches for establishing parallel circuits around said series switch and the respective field windings, a resistance in one of said parallel circuits, a switch for short circuiting said resistance, means for effecting a predetermined sequence operation of said switches so as to first close said parallel switches, open said series switch and then close said resistance short circuiting switch, a timing device, and means operated by said timing device for operating said switches in the reverse order after a predetermined time interval.

4. The combination with a synchronous motor provided with at least two field windings, a normally closed series switch between said field windings, parallel switches for establishing parallel circuits around said series switch and the respective field windings, means responsive to the closing of said parallel switches for opening said series switch, current limiting means in one of said parallel circuits and means responsive to the opening of said series switch for short circuiting said current limiting means.

5. The combination with a synchronous motor provided with at least two field windings, a normally closed series switch between said field windings, parallel switches for establishing parallel circuits around said series switch and the respective field windings, a resistance in one of said parallel circuits, a switch for short circuiting said resistance, a control device for closing said parallel switches, interlock control means between said switches for effecting the subsequent opening of said series switch and the closing of said resistance short circuiting switch in the order mentioned, a timing device, means operated by said control device for setting said timing device in operation, and means operated by said timing device for causing the operation of said switches in the reverse order after a predetermined time interval.

6. The combination with a synchronous motor provided with at least two field windings, a normally closed series switch between said field windings, parallel switches for establishing parallel circuits around said series switch and the respective field windings, a resistance in one of said parallel circuits, a switch for short circuiting said resistance, and means responsive to the load on said motor for effecting a predetermined operation of said switches so as to first close said parallel switches, open said series switch and then close said resistance short circuiting switch.

7. The combination with a motor provided with at least two field windings, means for normally connecting said field windings in series relation with each other, means responsive to the load on said motor for connecting said windings in parallel relation, time element means, means operated by said load responsive means for initiating the operation of said time element means and means operated by said time element means for reestablishing said series connections after a predetermined time interval.

8. The combination with a motor provided with at least two field windings, a series switch between said field windings, parallel switches for establishing circuits around said series switch and the respective field windings, means responsive to the load on said motor for closing said parallel switches, means responsive to the closing of said parallel switches for opening said series switch, a timing device, means operated by said load responsive means for initiating the operation of said timing device and means controlled by said timing device for reconnecting said field windings in series relation.

9. In a field control system for a synchronous motor provided with at least two field windings, a series switch between said field windings, a timing device, a resistance, means responsive to the load on said motor for initiating operation of said timing device and for closing parallel circuits around said field windings and said series switch, one of said circuits including said resistance, means responsive to the closing of said parallel cihcuits for opening said series switch, means responsive to the opening of said series switch for short circuiting said resistance, means operated by said timing device for reinserting said resistance, means responsive to the reconnection of said resistance for closing said series switch and means responsive to the closing of said series switch for opening said parallel circuits.

CHARLES E. KILBOURNE.